UNITED STATES PATENT OFFICE.

WILHELM BAUER AND ALFRED HERRE, OF OPLADEN, NEAR COLOGNE, GERMANY, ASSIGNORS TO SYNTHETIC PATENTS CO., INC., OF NEW YORK, N. Y., A CORPORATION OF NEW YORK.

YELLOWISH-BROWN VAT DYES.

1,266,092.   Specification of Letters Patent.   Patented May 14, 1918.

No Drawing.   Application filed March 23, 1915.   Serial No. 16,418.

*To all whom it may concern:*

Be it known that we, WILHELM BAUER and ALFRED HERRE, doctors of philosophy, chemists, citizens of the German Empire, residing at Opladen, near Cologne, Germany, have invented new and useful Improvements in Yellowish-Brown Vat Dyes, of which the following is a specification.

We have found that new and valuable vat dyestuffs can be obtained by condensing indoxyls or their acidylized derivatives, which are substituted in position 6 by a nitro or amino group with halogenated isatins. The reaction proceeds most probably e. g. in accordance with the following equation:

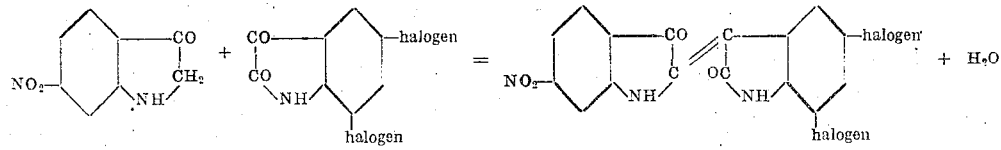

The new dyes are in a dry state dark crystals with a metallic luster which are soluble in concentrated sulfuric acid generally with a violet coloration. They yield with hydrosulfite and caustic soda lye yellow vats dyeing cotton after exposure to air yellowish-brown shades fast to chlorin and to light.

In order to illustrate the new process more fully the following example is given, the parts being by weight:—220 parts of 5.7-dichloroisatin and 262 parts of 6-nitro-diacetylindoxyl are dissolved in 2000 parts of hot glacial acetic acid, and the solution is heated on the water-bath during 2 hours with 100 parts of concentrated hydrochloric acid. The dyestuff which has separated is filtered off after cooling, washed and dried. It has most probably the following formula:

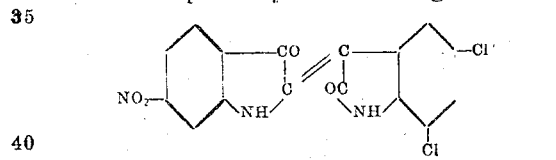

and crystallizes in violet needles having a metallic luster which are soluble in concentrated sulfuric acid with a bluish-violet coloration; dyeing cotton from the hydrosulfite vat in pure yellowish-brown shades fast to chlorin, washing and light. In the hydrosulfite vat the nitro-compound is converted into the amino-compound. The latter can be obtained in the following way: 20 parts of the nitro-compound are reduced with 50 parts of sodium hydrosulfite and 100 parts of caustic soda lye 30° Bé. and 3000 parts of hot water. The amino-product is isolated by blowing air into the solution. It is filtered off washed and dried. It is a dark brown powder, insoluble in the usual organic solvents, soluble in concentrated sulfuric acid with a reddish-violet coloration.

The said coloring matters can, if desired, be halogenated, the halogenated products producing dyeings of generally the same shade being faster than those obtained from the non-halogenated products. For this purpose e. g. 20 parts of the finely powdered amino-compound are suspended in 200 parts of nitrobenzene and to the mixture which has to be stirred 20 parts of bromin are added, while stirring is continued the mixture is heated in the interval of 3 hours to 150° C. and kept at this temperature during 3 hours. After cooling the product having most probably the formula:

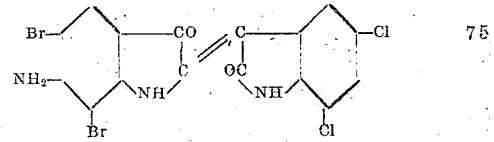

is filtered off, washed at first with a small quantity of alcohol, then with hot water and dried. It is a brown powder insoluble in the usual organic solvents; soluble in concentrated sulfuric acid with a violet coloration; and dyes cotton from an alkaline hydrosulfite vat yellowish-brown fast shades.

Instead of 5.7-dichloroisatin, 5.7-dibromoisatin, monochloro- or monobromoisatin, etc., can be used.

We claim:—

1. The new products being vat dyestuffs having most probably the following general formula:

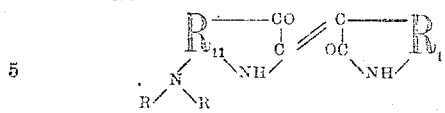

R includes oxygen and hydrogen; $R_1$ stands for a benzene nucleus which contains halogen; $R_{11}$ for a benzene nucleus which may contain halogen and which contains in position 6 the group

which dyes are in a dry state dark crystals with a metallic luster soluble in hot concentrated sulfuric acid generally with a violet coloration; and which yield with hydrosulfite and caustic soda lye vats dyeing cotton yellowish-brown shades remarkable for their fastness to chlorin and to light, substantially as described.

2. The new products being vat dyestuffs having most probably the following general formula:—

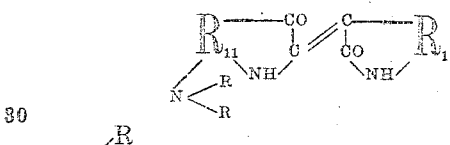

$-N\begin{subarray}{c}R\\R\end{subarray}$ being a group containing only one nitrogen atom wherein R stands for oxygen or hydrogen; $R_1$ stands for a benzene nucleus which contains halogen; $R_{11}$ for a benzene nucleus which may contain halogen and which contains in position 6 the group

which dyes are in a dry state dark crystals with a metallic luster soluble in hot concentrated sulfuric acid generally with a violet coloration; and which yield with hydrosulfite and caustic soda lye vats dyeing cotton yellowish-brown shades remarkable for their fastness to chlorin and to light, substantially as described.

3. The new products being vat dyestuffs having most probably the following atomic group:

wherein $R_1$ stands for a benzene nucleus which contains halogen; which dyes are in a dry state dark crystals with a metallic luster soluble in hot concentrated sulfuric acid generally with a violet coloration; and which yield with hydrosulfite and caustic soda lye vats dyeing cotton yellowish-brown shades remarkable for their fastness to chlorin and to light, substantially as described.

4. The new products being vat dyestuffs having most probably the following general formula:

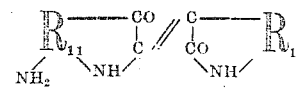

wherein $R_1$ stands for a benzene nucleus which contains halogen; $R_{11}$ for a benzene nucleus which may contain halogen and which contains in position 6 the group $-NH_2$; which dyes are in a dry state dark crystals with a metallic luster soluble in hot concentrated sulfuric acid generally with a violet coloration; and which yield with hydrosulfite and caustic soda lye vats dyeing cotton yellowish-brown shades remarkable for their fastness to chlorin and to light, substantially as described.

5. The new product having most probably the formula:

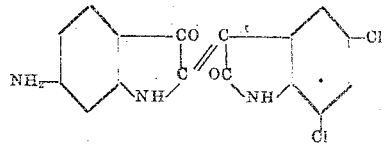

being a vat dye derivable from 5.7-dichloroisatin and 6-aminoindoxyl, which is in a dry state a dark brown crystalline powder with a metallic luster, insoluble in the usual organic solvents, soluble in concentrated sulfuric acid with a reddish-violet coloration; and dyeing cotton from the hydrosulfite vat in yellowish-brown shades fast to chlorin, washing and light, substantially as described.

In testimony whereof we have hereunto set our hands in the presence of two subscribing witnesses.

WILHELM BAUER. [L. S.]
ALFRED HERRE. [L. S.]

Witnesses:
HELEN NUFER,
ALBERT NUFER.